Feb. 10, 1953 B. McKIM 2,628,283

SEMIAUTOMATIC TELEPHONE SWITCHING SYSTEM ARRANGED FOR SELECTIVE ALTERNATING CURRENT OR DIRECT CURRENT KEY PULSING

Filed Sept. 16, 1948 4 Sheets-Sheet 1

INVENTOR
B. McKIM
BY
R. D. Covell
ATTORNEY

SEMIAUTOMATIC TELEPHONE SWITCHING SYSTEM ARRANGED FOR SELECTIVE ALTERNATING CURRENT OR DIRECT CURRENT KEY PULSING

Filed Sept. 16, 1948 4 Sheets-Sheet 2

INVENTOR
B. McKIM
BY
R. O. Covell
ATTORNEY

Feb. 10, 1953 B. McKIM 2,628,283

SEMIAUTOMATIC TELEPHONE SWITCHING SYSTEM ARRANGED FOR SELECTIVE ALTERNATING CURRENT OR DIRECT CURRENT KEY PULSING

Filed Sept. 16, 1948 4 Sheets-Sheet 3

INVENTOR
B. Mc KIM

BY R. O. Covell
ATTORNEY

Feb. 10, 1953 B. McKIM 2,628,283

SEMIAUTOMATIC TELEPHONE SWITCHING SYSTEM ARRANGED FOR SELECTIVE ALTERNATING CURRENT OR DIRECT CURRENT KEY PULSING

Filed Sept. 16, 1948 4 Sheets-Sheet 4

INVENTOR
B. Mc KIM
BY
R. O. Covell
ATTORNEY

Patented Feb. 10, 1953

2,628,283

UNITED STATES PATENT OFFICE 2,628,283

SEMIAUTOMATIC TELEPHONE SWITCHING SYSTEM ARRANGED FOR SELECTIVE ALTERNATING CURRENT OR DIRECT CURRENT KEY PULSING

Burton McKim, East Orange, N. J., assignor to Bell Telephone Laboratories, Incorporated, New York, N. Y., a corporation of New York Application September 16, 1948, Serial No. 49,588

7 Claims. (Cl. 179—27)

Figures 1, 1A, 5:
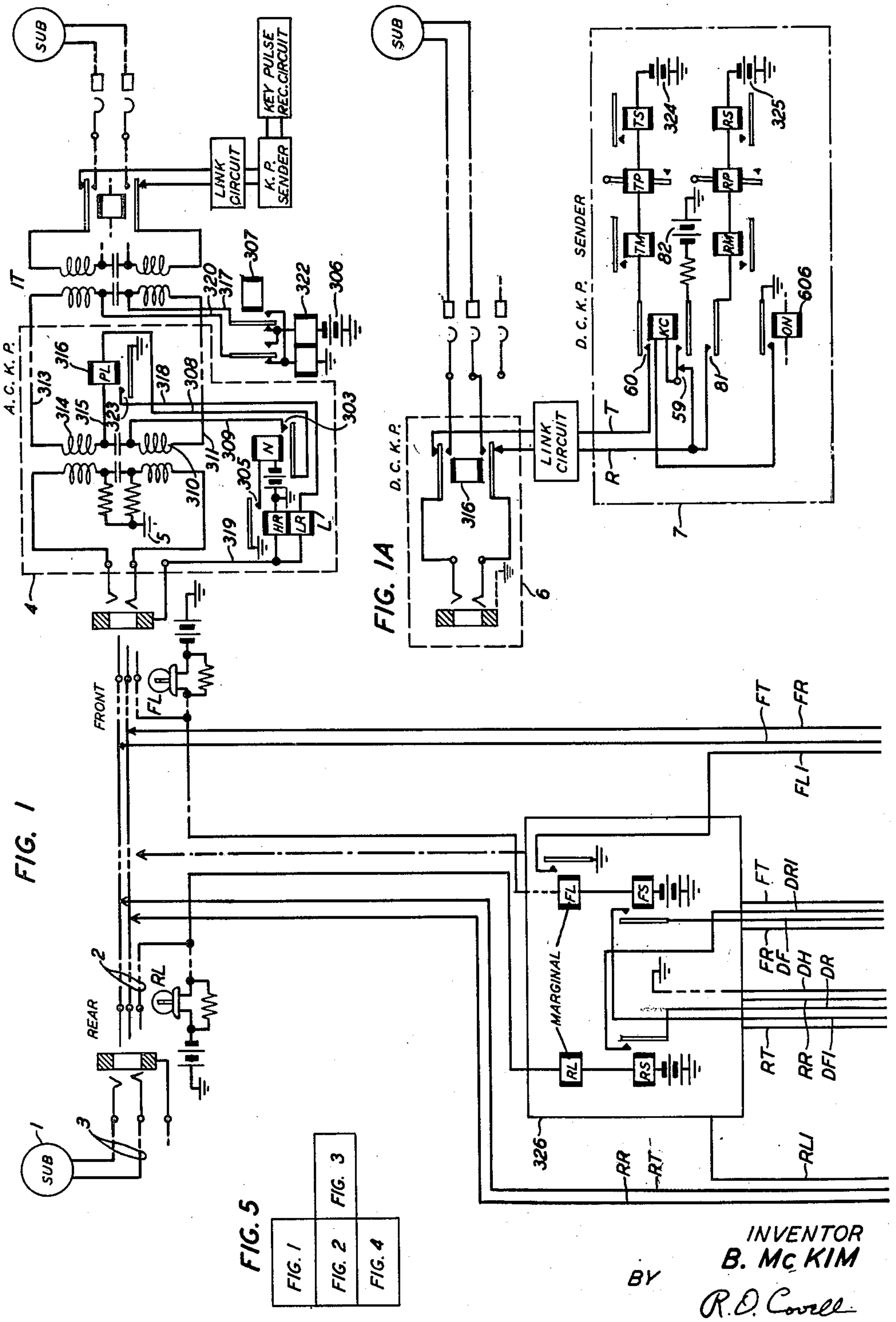

This invention relates to telephone systems and more particularly to toll switching systems.

One of the primary objects of the invention is to improve the circuit arrangement for toll switchboards whereby operation of said toll switchboard is made more flexible.

A further object of the invention is to simplify toll switchboard systems in which both direct current and multifrequency key pulsing are employed.

There is in the prior art one or more circuit arrangements whereby direct current key pulsing is attained. By way of example, United States Patent No. 1,780,906, granted to W. W. Carpenter and R. E. Hersey November 11, 1930, is referred to. In that patent the operator's key-set transmits marginal and reverse direct current impulses over the talking conductors of the cord circuit and the trunk, then through the link circuit to the responsive equipment in the sender. There is also disclosed in the prior art a circuit designed to transmit multifrequency key pulses over the talking cord circuits and trunks to the sender. For a detailed description of the circuit and operation thereof the reader is referred to United States Patent No. 2,288,251, granted to Paul B. Murphy June 30, 1942.

Prior to applicant's invention a toll switchboard was designed to use either direct current key pulsing or multifrequency key pulsing, but not both. For reasons disclosed in Patent No. 2,288,251, it has been found that for certain purposes multifrequency key pulsing is superior to direct current key pulsing. This is largely due to the fact that there are certain losses incident to the transmission of direct current impulses over long cable paths and to the fact that certain digit codes involve the transmission of impulses of different voltages requiring response of sensitive and marginal responsive relays in the sender.

Conversely there are very good reasons why direct current key pulsing is superior to multifrequency key pulsing under different circumstances. There are in commercial use several thousands of toll switchboards which are designed to handle direct current key pulsing, but many of these toll switchboards are becoming overburdened by heavier telephone toll traffic. It is believed that there will be in the future a great deal of decentralization of toll operation which will make it desirable to utilize these direct current toll switchboards for multifrequency key pulsing with as little change in said toll switchboards as possible. To construct and maintain equipment for the exclusive use of multifrequency key pulsing would be both very expensive and time consuming.

This invention embodies an operator's key-set circuit that can send either direct current or multifrequency key pulses, multifrequency key pulses being transmitted only in case the trunk circuit over which it is desired to send a signal and to which one of the cords at the position circuit is connected, is arranged to indicate to the position circuit that the said trunk terminates in an office arranged for multifrequency signaling. Similarly, direct current key impulses are transmitted to a trunk circuit only when that trunk circuit and the terminating office are adapted to receive direct current key pulses. Consequently this invention will automatically enable transmission of either multifrequency or direct current key pulsing signals from one key-set with very little change in existing circuits, whereas the prior art required two circuits with additional appartaus.

A clear and complete understanding of the invention will be facilitated by considering a telephone system in which the invention and its features are embodied, one such system being shown in the drawings which constitute a part of this specification.

Figure 2:
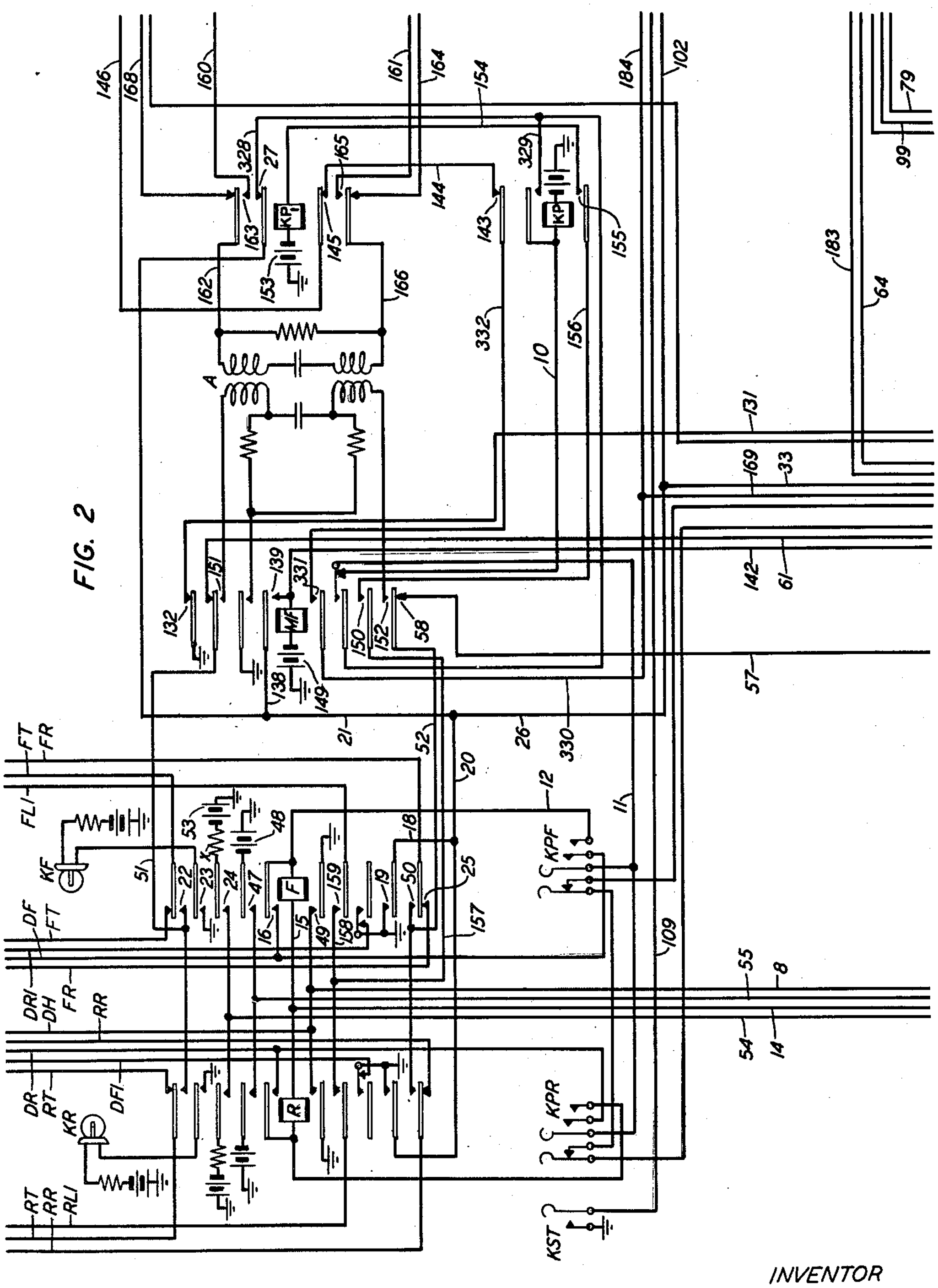
Figure 3:
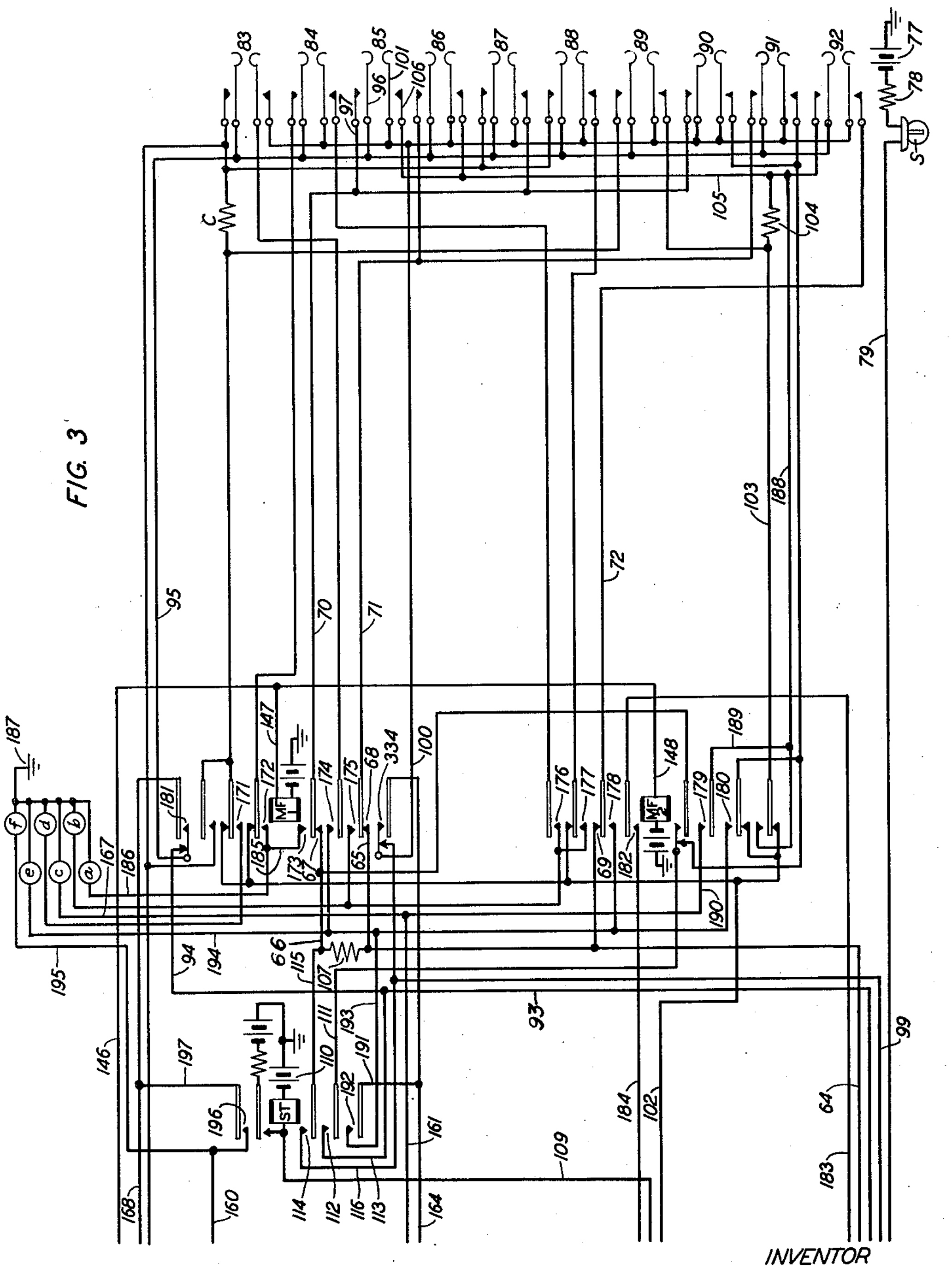
Figure 4:
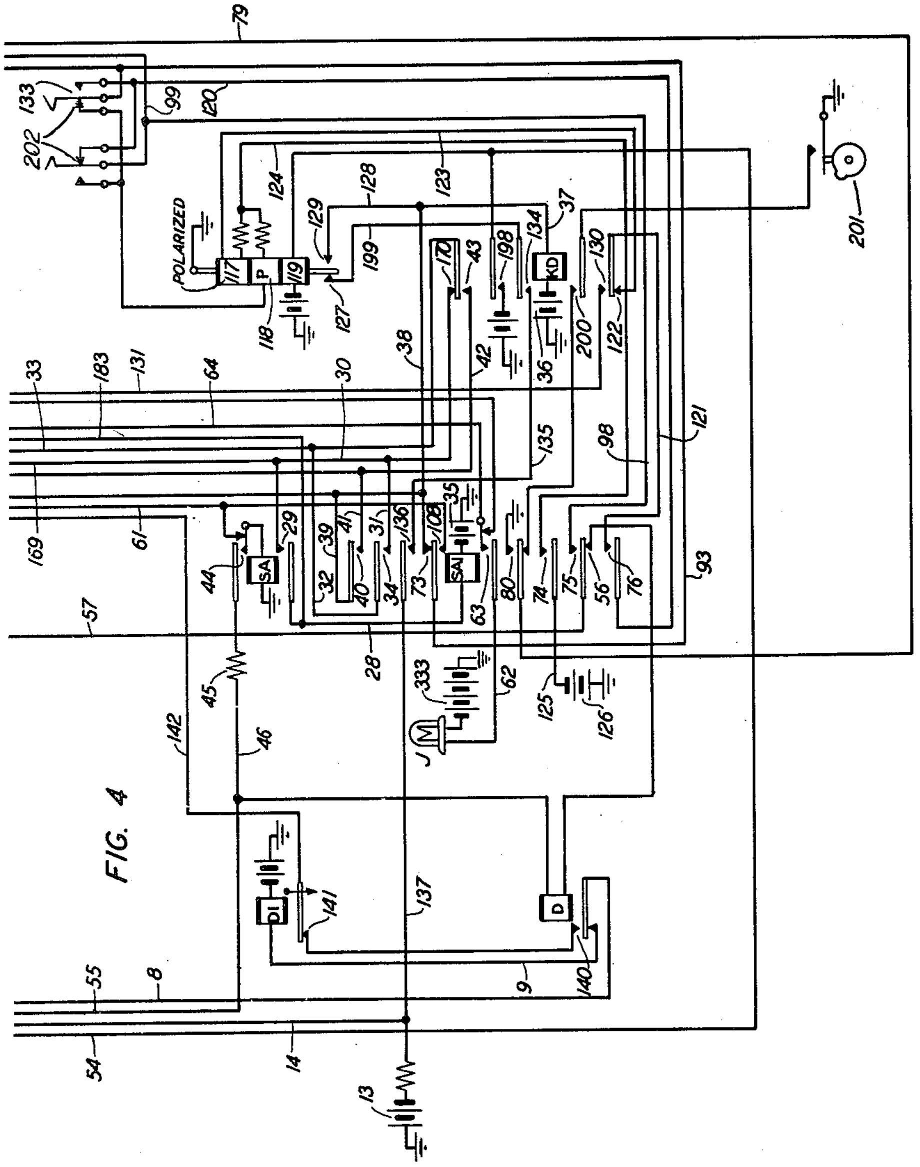

Referring to the drawings:

Figs 1 and 1A represent schematically a telephone system comprising a manual switchboard including operators cord, position and telephone circuits, outgoing truck circuits, and automatic switching equipment in another office for completing desired talking conversations between calling and called subscriber stations; Fig. 1 further shows, in diagrammatic form, key pulsing register, sender and link circuits associated with outgoing trunk circuits arranged for alternating current key pulsing; and Fig. 1A further shows trunk, link and key pulsing sender circuits arranged for direct current key pulsing;

Figs. 2, 3 and 4 show a key set circuit for use by an operator in extending connections to subscribers in the automatic office; and Fig. 5 shows the relative position in which the drawings are to be placed to form an operative arrangement.

In Fig. 1 a calling subscriber's station is shown connected to a trunk circuit 3 terminating in a jack at an operator position, one end of a cord 2 being inserted in the jack to answer the call.

Only as much of the cord, position, and trunk circuits are shown as are required for a complete description of the invention. Trunk circuit 4, in Fig. 1, is arranged to transmit multifrequency key pulses to a sender. Since this type circuit is well known in the prior art a complete drawing or description thereof is not deemed necessary. Reference is made to the Murphy patent cited hereinbefore. Ground 5 is connected to the ring lead of the front plug at the time it is connected to trunk 4. As will be explained later this ground completes the circuit for the winding of test relay D to operate relay D and prepare the key-set circuit for transmission of multifrequency key pulses. Trunk circuit 6, in Fig. 1A, is adapted to transmit direct current key pulses to a sender. This type circuit is also well known in the prior art and the drawing and description thereof are not detailed. The key pulse sender 7 is also designed to receive direct current key pulses. Shown in key pulse sender 7 are relays KC, TM, TP, TS, RM, RP, RS, and ON, and 24-volt batteries 324 and 325. The relays KC, TM, TP, TS, RM, RP, and RS are individually and independently operated by various combinations of battery, resistance battery, ground, and resistance ground impulses from the key-set shown in Fig. 3. Fig. 1 also shows a block diagram 326 representing position and telephone circuits. Position and telephone circuits such as used here are also well known in the prior art and therefore detailed drawings or description are not considered necessary. Reference is made to United States Patent 2,276,515, issued March 17, 1942, to T. D. Robb for a full description of such circuits.

Referring to Fig. 2, relay F and relay R are respectively associated with the front cord circuit and the rear cord circuit. Relay F and relay R are utilized in both direct current and multifrequency key pulsing. If the key pulsing is to be done over the rear cord, relay R is operated and relay F is not operated. If the key is pulsing is to be done over the front cord then relay F is operated and relay R remains unoperated. It will be assumed that relay F is operated for purposes of this disclosure. The purpose of relay F is to connect the key-set to the trunk circuit and prepare said key-set for determination of the type key pulsing to be transmitted to said trunk. This operation will be described in detail later. Relay MF is utilized when the trunk circuit 4 is arranged for receiving multifrequency key pulses. Operation of relay MF acting in cooperation with other relays KP, KP1 and SA1, prepares the key-set for the transmission of multifrequency key pulses. The front and rear cord key pulsing keys KPF and KPR are operated manually by the operator. Their function is to operate relay F or relay R respectively, and also relay KP. Relay KP performs no useful function on a call requiring a direct current key pulse but on calls requiring multifrequency key pulsing the KP relay is utilized to transmit a signal to the sender to notify the sender that multifrequency key pulsing is about to begin. The KST key is operated manually by the operator on direct current key pulsing after the numerical keys shown in Fig. 3 have been operated. This will cause relay ST to operate and connect ground to the tip conductor and resistance battery to the ring conductor to indicate to the sender that no more digits will be keyed. Similarly, in the case of multifrequency key pulsing operation of manual key KST operates relay ST in Fig. 3 to transmit a signal which indicates to the sender that no more digits will be keyed. In Fig. 3 relays MF1 and MF2 in operating transfer the leads of the numerical keys from the battery and ground potentials used for direct current pulsing to the alternating-current sources required for multifrequency pulsing. Relay MF2 also completes the circuit for operating relay SA1 shown in Fig. 4. The various alternating-current sources *a, b, c, d, e, f,* used in multifrequency pulsing are also shown in Fig. 3. Numerical keys 83 through 92 are operated by the operator to transmit either direct current or multifrequency pulsing to the trunk circuit being used. Sender lamp S is operated upon operation of relay SA1 of Fig. 4 and indicates to the operator that the sender is ready to receive key pulses from the key-set.

In Fig. 4 relays D and D1 are associated both with direct current and multifrequency key pulsing. D1 is a slow-to-release relay which will not release when direct current key pulsing is required by the trunk circuit. Relay D is operated when its winding circuit is completed by ground being applied to the ring lead in the trunk circuit. In the case of a trunk circuit requiring direct current pulsing the said ground is removed and relay D becomes deenergized before relay D1 has time to release. Thus relay MF will not operate. In the case where the trunk circuit requires multifrequency key pulsing the ground applied to the winding of relay D to complete the circuit of said winding is not removed from said winding and relay D1 has sufficient time to release, thus causing operation of relay MF.

In direct current key pulsing, relay SA1 is operated by relay SA which is operated when the direct current sender is attached to the trunk circuit. Operation of relay SA1 prepares the key-set circuit for transmission of impulses and notifies the key monitoring circuit (not shown) that the sender is ready to receive registrations from the key-set. Details of this operation will be described in detail later. For both direct current and multifrequency key pulsing operation of relay SA1 prepares for the later operation of relay P. Relay P is a polarized relay with three windings. Its function is to return the entire key-set circuit to normal condition after registration has been completed. Relay KD is operated by relay P to act in cooperation with relay P in returning the key-set circuit to normal condition.

The operation of the circuit will now be described in greater detail. It will be assumed that the trunk circuit involved in this call requires a direct current key pulse registration. When the front cord is plugged into an outgoing trunk circuit the said trunk circuit starts a two-way link circuit hunting for the trunk and for an idle sender. Ground is connected to lead DF1 by means well known in the telephone art. Operation of the cord talking key (not shown) causes relays in the position circuit to function to loop leads DF1 and DF together and to connect ground to lead DH. The operation of the talking key and position circuit is well known in the prior art and the detailed operation of them will not be discussed here. Ground on lead DH causes relay D1 to operate by establishing a circuit through lead 8, through armature of relay D, through lead 9, through the winding of relay D1, to negative battery. It is to be noted here that the core of relay D1 must become saturated before relay D operates so that relay D1 will not be released by relay D while said relay D is testing for ground on the ring conductor FR.

Operation of the front key pulsing key KPF connects ground on the DF lead to the winding of relay KP through leads 11 and 10 and to the winding of relay F through lead 12. Relay F operates by reason of a completed circuit through negative battery 13, lead 14, lead 15, winding of relay F, through lead 12 to ground on lead DF. A locking circuit for relay F is then established from the same negative battery, through leads 14 and 15, through the winding of relay F, and then through contact 16 to ground on lead DF. The winding of relay KP is energized through a circuit extending from negative battery, winding of relay KP, lead 10, lead 11, through contacts of front key pulsing key KPF to ground on lead DF. Operation of said relay KP establishes a locking circuit for said relay KP from battery, through contact of relay KP, lead 329, lead 328, contact 27 of relay KP1, to ground on lead 21. The ground on lead 21 is caused by the operation of relay F which closes contact 19 and extends ground potential through leads 18 and 20 to lead 21.

When relay F operates, it actuates contacts which, (1) light the KF lamp through contact 23 to indicate that the key-set is associated with the front cord; (2) open the operating circuit for relay R; (3) supply ground to the key-set circuit through lead 26 and for locking up relays SA1, KP and KD. The locking circuit for relay SA1 will be described later. The locking circuit for relay KP has been heretofore described. For relay KD the locking circuit extends from negative battery 36, through winding of relay KD, lead 37, lead 38, lead 39, contact 40 of relay SA1, lead 41, lead 42, and contact 43 (when closed) to ground. Operation of relay F also provides 60-ohm resistance battery to the winding of relay SA from ground, through contact 44 (when closed), resistance 45, lead 46, contact 47, battery 48, to ground. In addition, relay F performs the following functions when it operates, (4) connects ground to the DH lead through contact 49 so as to hold the key pulsing circuit locked to the cord circuit even though the talking key (not shown) should be restored to its normal position; (5) disconnects the tip and ring leads of the cord circuit from the position circuit and connects them to the key pulsing circuit. The lead FT now extends from the tip lead in the cord circuit through contact 22 of relay F, to lead 51. The lead FR now extends from the ring lead in the cord circuit through contact 50 to lead 52. Continuing, the operation of relay F connects biasing battery 53 through resistance X to winding 119 of relay P through conductor 54, and also establishes a circuit from negative 24-volt battery through contact 47, conductor 55, winding of relay D, contact 56 of relay SA1, conductor 57, contact 58 of relay MF, conductor 52, contact 50 of relay F, conductor FR, to the ring conductor of the front cord.

As soon as the link circuit in Fig. 1A has found an idle circuit and has connected the direct current key pulsing sender 7 to the trunk circuit 6, battery 48 through relay D is connected over the ring conductor through the link in the path just described and then through the winding of relay KC, the contact of relay ON, which is closed at this time by means well known in the telephone art, and then to ground. Relay D operates and opens the operating circuit for relay D1. Since relay D1 has a slow-to-release characteristic, it does not release immediotely. Before sufficient time has elapsed to effect a release of relay D1, however, relay KC in the sender operates to open contact 59 and close contact 81, thus removing ground from the winding of relay D and replacing said ground with a 24-volt negative battery which is equal to and opposed in polarity to 24-volt battery 48, causing deenergization of relay D. Relay D1, therefore, remains energized. In operating, relay KC disconnects itself from the ring conductor by opening contact 59, and relay KC is thereafter energized by battery 82. Battery 324 is connected to the tip conductor when contact 60 closes to operate relay SA by a circuit extending from ground, through the winding of relay SA, conductor 61, contact of relay MF, conductor 51, contact 22 of relay F, conductor FT, the tip conductor of trunk circuit 6, through contact 60, and the windings of relays TM, TP, TS, to negative battery. Relay SA, in operating, locks under control of relay F by virtue of contact 47 of relay F. Operation of said relay SA causes relay SA1 to operate by establishing a circuit from negative battery, through the winding of relay SA1, conductor 28, contact 29 of relay SA, conductor 30, contact 170 of relay KD, to ground on lead 33. A locking circuit for relay SA1 is now established from negative battery 35, through the winding of relay SA1, conductor 28, contact 29 of relay SA, conductors 30 and 31, contact 34 of relay SA1, to ground on lead 32. Relay SA1, in operating disconnects relay D from the ring conductor FR by opening contact 56; connects the tip 61 and ring 57 conductors of the cord circuit to the key-set keys; connects 48-volt battery 333 through ballast lamp J to the key-set keys in place of the ground through resistance C. This circuit can be traced from negative battery 333, through ballast lamp J, conductor 62, contact 63 of relay SA1, conductor 64, conductors 65 and 66, contacts 67, 68 and 69 of relays MF1 and MF2, conductors 70, 71 and 72, and thence to the keys of the key-set. Operation of relay SA1 also opens the circuit from the key-set keys to relay KD by virtue of contact 73 being opened, closes contacts 74, 75, and 76 for the later operation of relay P, and lights the sender lamp S by a circuit extending from negative battery 77, through resistance 78, through sender lamp S, conductor 79, contact 80, to ground.

The lighting of the sender lamp indicates to the key-set operator that the sender is ready to receive registrations from the key-set. The operator depresses the numerical keys shown in Fig. 3 in the order corresponding to the code and number to be registered. Various combinations of light and heavy battery and ground pulses are transmitted over the tip and ring conductors to the sender register relays. These combinations are such that relay P will not be operated at this time. For an example, let it be assumed that key 85 is operated. Contact is made between conductors 97 and 96 and between conductors 101 and 106. Conductor 97 can be traced from 48-volt battery 333, through lamp J, conductor 62, contact 63 of relay SA1, conductor 64, resistance 107, conductor 66, contact 67, conductor 70, to conductor 97. Thus negative signaling battery through resistance 107 is impressed on conductor 96 which can be traced to the tip conductor through conductor 95, a back contact of relay MF1, conductor 94, conductor 93, contact 108 of relay SA1, conductor 61, back contact of relay MF, conductor 51, contact 22 of relay F, conductor FT, to the tip conductor of the cord and jack, back contact of relay 316 of trunk circuit 6, contact 60 of relay K6, and windings of relays TM, TP, and TS to battery 324. Conductor 106 is at ground potential by virtue of a circuit extending from ground, through contact 19 of relay F, conductor 18, conductor 20, conductor 26, conductor 102, a back contact of relay MF2, conductor 103, resistance 104, conductor 105, to conductor 106. This ground potential is impressed on conductor 101 which can be traced to the ring lead through conductor 100, a back contact of relay MF1 (not operated), conductor 99, conductor 98, contact 75 of relay SA1, conductor 57, contact 58 of relay MF, conductor 52, contact 59 of relay F, conductor FR, to the ring lead of the cord and jack, a back contact of relay 316 of trunk circuit 6, contact 81 of relay KC, and the windings of relays RM, RP and RS to battery 325. The relays in the sender respond to these potentials to register intelligence in a well-known manner.

In a similar manner the other keys of the key-set can be operated to transmit signals composed of current impulses to the sender. If the connected trunk or intertoll circuit is in a class requiring a definite number of digits the key-set will be released automatically on completion of keying in a manner to be described later. If it is a class requiring a variable number of digits, it will not be automatically disconnected. On such calls the KST key will be operated after operation of the numerical registration keys. Operation of the KST key will cause relay ST to operate by reason of a circuit established from the KST key, through conductor 109, through the winding of relay ST, to battery 110, and thence to ground. Operation of relay ST connects ground through conductor 61 to the tip conductor of the cord and resistance battery to the ring conductor of the cord to indicate to the sender that no more digits will be keyed. Ground is connected to the tip conductor 61 by a circuit traceable from conductor 111 which is at ground potential, through contact 112 of relay ST, to conductor 113 which can be traced to the tip conductor T of sender circuit 7 in a circuit heretofore described. Resistance battery 333 is connected to the ring lead 57 through a circuit extending from lead 115, upon which the resistance battery voltage is impressed through contact 114 of relay ST, to conductor 116, and then to the ring conductor of sender circuit 7 in a manner heretofore described.

After the last impulse has been transmitted to the sender, the sender circuit 7 connects signaling battery of the same voltage as battery 333 to both the tip and the ring conductors to operate relay P in the key-set circuit. The connection from the ring lead of the front cord can be traced through conductors FR, 52, 57, 98, 120, 121, 123, and then through winding 117 of relay P to conductors 124, 125, and to negative battery 126. The connection from the tip lead of the front cord can be traced through conductors FT, 51, 61, 93, then through winding 118 of relay P to conductors 124, 125, and then to negative battery 126. Relay P is so constructed that the biasing winding 119, when energized, will maintain contact 127 closed unless both winding 117 and winding 118 are energized by the aforementioned signaling battery in the sender circuit 7. Relay P, in operating, operates relay KD by closing contact 129. Relay KD, in operating, locks under control of relay F so that after relay P is deenergized, opening contact 129, relay KD remains energized. The locking circuit is traced from ground on conductors 33 through conductors 42, 41, 39, 38, 37, to the winding of relay KD, and then to negative battery 36. Operation of relay KD also shuts the biasing winding 119 of relay P so that it will hold on either winding 117 or 118, and disconnects either the tip 93 or the ring conductor 98 from relay P and connects ground over that lead to the sender, determining whether or not automatic start of machine ringing is required.

If automatic start of machine ringing is required, the operation of relay KD connects conductor FR, through conductor 52, conductor 57, contact 75, conductor 98, conductor 120, contact 76, conductor 121, contact 130 of relay KD, conductor 131, contact 132 of relay MF, to ground. The sender interprets this signal in a well-known manner and removes battery from conductors T and R and later transmits a short pulse of ringing current over the trunk to the called office.

Where automatic start of machine ringing is not required by the intertoll trunk circuit, the operator manually operates key 202 so that when relay KD operates, conductor FT is connected through conductor 51, conductor 61, conductor 93, contact 133 of manual key 202, conductor 120, conductor 121, contact 130 of relay KD, conductor 131, contact 132 of relay MF, to ground. In this case also the sender disconnects battery from the tip and ring conductors but does not transmit the pulse of ringing current.

When the signaling battery is disconnected from conductors T and R in the sender, relay P releases and contact 127 of relay P is made and contact 129 is broken. Ground potential on the armature of relay P then passes through contact 134 of relay KD, conductor 135, contact 136 of relay SA1, conductor 137, conductor 14, conductor 15, to shunt relay F from its battery source 13. Relay F releases and causes the release of relays KP, SA, SA1 and KD by removing ground or battery from their various circuits previously described and releases D1 if the talking key has been restored. Release of relay F also extinguishes the KF lamp and the sender S lamp. Since relay SA is released, battery source 333 is removed from the key-set keys. The circuit is now in its normal non-operating condition except for relay D1 which is not released until the talking key has been released.

The foregoing discussion has been devoted exclusively to an instance where the intertoll trunk circuit and its associated circuits have been adapted to receiving direct current key pulsations. There are instances, however, when a cord circuit is connected to a trunk circuit required to transmit multifrequency key pulses to a sender circuit. The operation of the key-set circuit under such circumstances will now be described in detail.

Let it be assumed that the key-set operator has plugged the front cord into the outgoing trunk circuit 4 and the cord-talking key has been operated, and relays in the position circuit have functioned to connect ground to lead DH and to loop the ground from lead DF1 to lead DF. Relay D1 is then operated in a manner described previously. Also as described hereinbefore, operation of the front key pulsing key KPF connects ground on the DF lead to the windings of relays KP and F. Relay KP operates and locks under control of relay F. Relay KP is operated at this time to allow time for the core of the winding to become saturated to stabilize the releasing time of the relay. Relay F, in operating, (1) lights the KF lamp to indicate that the key-set is associated with the front cord; (2) opens the operating circuit for relay R; (3) supplies ground to conductor 192 of the key-set circuit and for locking up relays SA1, KD, KP, MF, MF1 and MF2. The circuits supplying ground for relays SA1, KD and KP, have been discussed previously. For relays MF, MF1 and MF2 the locking grounds may be traced by circuits described later. Returning again to the operation of relay F further results of the operation of said relay are (4) connects ground to lead DH for holding the key pulsing circuit locked to the cord circuit even though the talking key should be restored to its normal position; (5) disconnects the tip and ring leads of the cord circuit from the position circuit and connects them to the key-set circuit; (6) connects biasing battery 53 through resistance X to relay P; and (7) connects 24-volt battery 48 through low resistance relay D, conductors 57, 52 and FR to the ring conductor of the front cord. Relay D, in operating, opens the operating circuit for relay D1. It will be noted that in the case of direct current key pulsing relay D remained operated for only a short period of time inasmuch as ground was removed from the ring conductor by operation of relay KC in the sender. The interval of time relay D was operated in the case of direct current key pulsing was insufficient to allow slow-to-release relay D1 to release. In the case of multifrequency key pulsing, however, the ground 5 placed on the ring conductor is not removed and consequently relay D remains operated and relay D1 releases. With relay D operated and relay D1 released, ground is connected through contact 49 of relay F, conductor 8, contact 140 of relay D, contact 141 of relay D1, conductor 142, to the winding of relay MF. Relay MF operates, providing multifrequency key pulsing for the connected trunk circuit 4. In operating, relay MF, (1) locks under control of relay F in a circuit extending from ground, through contact 19 of relay F, conductors 18, 20, 21, 138, contact 139 of relay MF, winding of relay MF, to negative battery 149; (2) closes in part circuits for operating relays KP1, MF1 and MF2. The part of the circuit closed for operating relay KP1 is contact 150 of relay MF, and for relays MF1 and MF2 it is contact 331 of relay MF. Closing of contacts 151 and 152 of relay MF transfers the tip and ring conductors 51 and 52, from conductors 61 and 57, respectively, to the repeating coil A in obvious circuits. Operation of relay MF also releases relay D by opening contact 58, thus removing ground from the winding of relay D. Another function of the operation of relay MF is to open contact 132 and thus remove ground from contact 133 of relay KD so that there is no interference with the disconnect feature of the key-set circuit.

When the front cord circuit was plugged into the outgoing trunk circuit relay L operated in series with the windings of relays FS and FL in the operator's position circuit. The closing of contact 305 completed the winding circuit for relay N. Operation of relay N closed contact 303. The closing of contact 303 completed the circuit over the trunk from negative battery 306 in the called central office, through the winding of relay 322, a contact of relay 307, conductor 317, conductor 311, winding 310, conductor 309, contact 303, conductor 308, winding 316 of relay PL, conductor 315, winding 314, conductor 313, conductor 320, a contact of relay 307, winding of relay 322 to ground. Relay PL does not operate at this time because it is a polarized relay and the current through its winding is in the wrong direction to operate relay PL.

The sleeve lead 319 may be traced from the windings of relay L into the position circuit, to the winding of marginal relay FL, then to the winding of relay FS, and then to battery. When the sleeve lead 319 can go to ground through the low resistance winding LR of relay L, the marginal relay FL will operate to place ground on lead FL1 so that relay KP1 may operate. But when relay PL is not energized, then sleeve lead 319 must go to ground through the high resistance winding HR of relay and marginal relay FL will not operate. Therefore no ground is applied to lead FL1 and relay KP1 will not operate. This is the situation existing before relay PL has operated. When a sender is attached to the trunk circuit IT in the called office relay 307 is energized and the current through the winding of relay PL is reversed by virtue of the conductors 320 and 317 being interchanged with respect to the battery 306. Operation of relay PL closes contact 323 of relay PL thus placing ground on the low resistance winding LR of relay L which allows marginal relay FL to operate and place ground on lead FL1. For a full and detailed description of the trunk circuit and associated link circuits, sender, and key pulse receiving circuit, reference is made to United States Patent 2,288,251, granted to P. B. Murphy on June 30, 1942. After ground is placed on lead FL1 the cord lamp FL lights and relay KP1 operates in a circuit extending from 24-volt negative battery 153, through the winding of relay KP1, conductor 154, contact 155 of relay KP, conductor 156, contact 150 of relay MF, conductor 157, conductor 158, contact 159 of relay F, to ground on conductor FL1.

Relay KP1, in operating, connects repeating coil A through conductors 160 and 161 to tone sources *f* and *c*, thereby transmitting a key pulsing signal over the trunk to the sender in the called office. The key pulsing tone signal is a signal to the sender. The numerical keys are not connected to the repeating coil during transmission of the key pulsing tone signal so as to prevent this tone signal from being mixed with the other tone signals should the operator key prematurely. The key pulsing tone signal circuit may be traced from repeating coil A, through conductor 162, contact 163 of relay KP1, conductor 160, tone source *f*, tone source *c*, conductor 167, conductor 161, contact 165 of relay KP1, conductor 166, and back into repeating coil A. From repeating coil A the signal is transmitted over the tip and ring leads of the cord, through the repeating coil of outgoing trunk circuit 4, over the trunk to the called office, through the repeating coil of incoming trunk circuit IT, and then to the attached sender. Returning to the operation of relay KP1, operation of said relay KP1 opens, in part, the operating circuit for relays MF1 and MF2 by opening contact 145 and opens the locking circuit for relay KP by opening contact 27. Assuming that the key pulsing key KPF has been released, relay KP releases slowly and opens the operating path for relay KP1 by opening contact 155 of relay KP. The slow release of relay KP is to insure that the KP tone leads are connected to the repeating coil A long enough to satisfy the sender.

Relay KP1, in releasing, transfers the tip 162 and ring 166 leads from the tone sources *f* and *c* to conductors 168 and 164, respectively. In addition, the release of relay KP1 completes the circuit for operating relays MF1 and MF2 in a circuit extending from the windings of relays MF1 and MF2, through conductor 146, contact 145 of relay KP1, conductor 144, contact 143 of relay KP, conductor 332, contact 331 of relay MF, conductor 330, conductor 169, contact 170 of relay KD, and through contact 19 of relay F to ground.

Relays MF1 and MF2, in operating, transfer the leads of the numerical keys 83 through 92 from the battery 333 and ground supplies used for direct current pulsing to the tone sources required for multifrequency pulsing. This latter is accomplished by closing contacts 171, 172, 173, 174 and 175 of relay MF1 and contacts 176, 177, 178, 179 and 180 of relay MF2. The closing of contacts 181 and 334 of relay MF1 connects the repeating coil A to the key-set, which is in readiness for the transmission of key pulsing signals. Contact 182 of relay MF2 also closes to complete the circuit for relay SA1. Said circuit extends from negative battery 35, through the winding of relay SA1, conductor 28, conductor 183, contact 182 of relay MF2, conductor 184, conductor 169, contact 170 of relay KD, to ground on conductor 33.

Relay SA1, in operating, closes contacts 74, 75 and 76 in preparation for the later operation of relay P, and closes contact 80 which lights the sender lamp S by completing a circuit hereinbefore described and informs the operator that keying may be initiated.

The operator may now operate the keys corresponding to the code number desired. Various combinations of alternating current signals are sent out to the trunk circuit. One of these circuits will be traced as an example. Let it be assumed that key 85 is depressed. Conductor 97 is connected to conductor 96 and conductor 101 is connected to conductor 106. A circuit may now be traced from alternating current source *a*, through conductor 186, conductor 185, contact 173 of relay MF1, conductor 70, conductor 97, conductor 96, conductor 95, contact 181 of relay MF1, conductor 168, conductor 162, coils of repeating coil A, conductor 166, conductor 164, contact 334 of relay MF1, conductor 100, conductor 101, conductor 106, conductor 188, conductor 189, contact 179 of relay MF2, conductor 190, conductor 167, alternating current source *c*, to alternating current source *a*. Similar circuits for other keys may be traced. The repeating coil A carries the two alternating current frequencies to the trunk circuit and the receiving circuit associated with the sender responds to these signals and causes the code and number to be registered in the sender.

After the operator has completed registration she will wish to release the key-set. This may be accomplished by operation of the KST key which completes the circuit for the winding of relay ST described before herein, and will operate relay ST. Relay ST, in operating, connects alternating current sources *e* and *f* to repeating coil A through circuit connections extending from conductor 166, through conductor 164, conductor 191, contact 192 of relay ST, conductor 193, conductor 194, alternating current source *e*, alternating current source *f*, conductor 195, contact 196 of relay ST, conductor 197, conductor 168, to repeating coil A. This signal will indicate to the sender that no more digits will be keyed. Operation of relay ST also connects battery 333 through resistance 107 to windings 117 and 118 of relay P to operate relay P.

Relay P operates and in operating, operates relay KD by means of a circuit extending from ground, through the armature of relay P, contact 129 of relay P, conductor 128, conductor 37, winding of relay KD, to negative battery 36. Operation of relay KD also opens the circuit through winding 117 of relay P by opening contact 122 and shunts winding 119 of relay P by closing contact 198. When relay KD operates, it closes a locking circuit extending from the winding of relay KD, through conductor 37, conductor 38, conductor 39, contact 40 of relay SA1, conductor 41, conductor 42, contact 43 of relay KD, to ground on conductor 33. This ground is under control of relay F as was described previously.

When the operator releases the KST key, relay ST releases, tone sources *e* and *f* are disconnected from repeating coil A, and resistance battery is disconnected from the primary and secondary windings 117 and 118 of relay P to release relay P. Release of relay P closes a circuit connection from ground, through the armature of relay P, contact 127, conductor 199, contact 134 of relay KD, conductor 135, contact 136 of relay SA1, to conductor 137. This circuit connection shunts relay F and consequently causes the release of relay F. As described in the case of direct current key pulsing, the release of relay F removes ground or battery from all the relays and they all therefore release except relay D1. Lamps KF and S are extinguished and the cord circuit is reconnected to the position circuit. The key-set circuit is in its normal position.

If the operator should depress any of the numerical keys before the sender lamp S lights, in the case of direct current key pulsing, or before relay MF1 operates, in the case of multifrequency key pulsing, ground will be applied from the key-set to relay KD. In the case of direct current key pulsing this ground may be traced from contact 19 of relay F, through conductors 18, 20, 25, 102, and then into all of the keys. Operation of any key places ground on lead 95 which can be traced through conductors 95, 94, and 93, contact 73 of relay SA1 since relay SA1 will not yet be operated, conductor 38, conductor 37, to relay KD. In the case of multifrequency key pulsing, the ground will be momentarily applied to relay KD in a similar manner. After relay MF1 is operated, however, lead 95 no longer can be traced to the winding of relay KD and therefore no ground would be applied to relay KD should the operator key prematurely. Relay KD locks under control of keys KPR and KPF, and closes contact 200 connecting the sender lamp S to the 120-impulses per minute interrupter circuit 201, thus flashing the lamp. To restore the key-set circuit to a pulsing condition, either key pulsing key KPF or KPR is momentarily operated, releasing relay KD by momentarily removing ground therefrom. In releasing, relay KD closes a circuit for operating relay SA1 provided a sender has been found in the meantime and relay SA, in the case of direct current key pulsing, or relays MF1 and MF2, in the case of multifrequency key pulsing, has been operated.

In case of trouble arising, the operator may pull down the cord to which the key-set is attached, causing the position circuit to open the loop between leads DF1 and DF or DR1 and DR to release relay F or R, respectively, which, in releasing, restores the circuit to normal in a manner hereinbefore described.

What is claimed is:

1. In a telephone system, a key-set circuit, comprising a set of digit keys, a plurality of trunk circuits, a first number of said trunk circuits each including means for supplying and applying to said key-set circuit a first set of electrical conditions indicating that a first type of key impulses is to be transmitted over each of said first number of trunk circuits by said key-set circuit, a second number of said trunk circuits each including means for supplying and applying to said key-set circuit a second set of electrical conditions different from said first set of electrical conditions and indicating that a second type of key impulses is to be transmitted over each of said second number of trunk circuits by said key-set circuit, means including a cord circuit for connecting said key-set circuit to any one of said trunk circuits, a first transmitting means included within said key-set circuit and comprising first voltage sources and said digit keys for transmitting said first type key impulses, a second transmitting means included within said key-set circuit and comprising second voltage sources and said digit keys for transmitting said second type key impulses, means responsive to said sets of electrical conditions comprising testing relays for determining whether a trunk circuit to which said cord circuit is connected is one of said first number or one of said second number of trunk circuits, and means controlled by said determining means for connecting said first transmitting means to the any one of said first number of trunk circuits to which said cord circuit is connected, and for connecting said second transmitting means to any one of said second number of trunk circuits to which said cord circuit is connected.

2. In a telephone system, a plurality of cord circuits, a first number of trunk circuits each including means for supplying and applying a first set of electrical conditions to any connected one of said cord circuits, said first set of electrical conditions indicating that a trunk circuit is arranged to transmit direct-current key impulses, a second number of trunk circuits each including means for supplying and applying a second set of electrical conditions to any connected one of said cord circuits, said second set of electrical conditions indicating that a trunk circuit is arranged to transmit alternating-current impulses, and a key-set circuit comprising a set of numerical keys, direct-current sources, alternating-current sources and means including testing relays selectively responsive to said different sets of electrical conditions for connecting said direct-current sources to said numerical keys to enable the transmission of direct-current key impulses through a connected cord circuit to one of said first number of trunk circuits responsive to actuation of any one of said keys, and for connecting said alternating-current sources to said numerical keys to enable the transmission of alternating-current key impulses through a connected cord circuit to one of said second number of trunk circuits responsive to actuation of any one of said keys.

3. In a telephone system, jack-ended trunk lines including a first group of trunk lines requiring direct-current key impulses to be transmitted thereover and a second group of trunk lines requiring alternating-current key impulses to be transmitted thereover, a plurality of cord circuits each for connecting to any one of said trunk lines, a key-set circuit including a key-set for encoding information into electrical impulses to be transmitted over any cord circuit to a connected one of said jack-ended trunk lines, means comprising direct-current voltage sources and said key-set included in said key-set circuit for transmitting direct-current impulses over a cord circuit to any one of said first group of trunk lines when said cord circuit is connected thereto, and means comprising alternating-current voltage sources and said key-set included in said key-set circuit for transmitting alternating-current impulses over a cord circuit to any one of said second group of trunk lines when said cord circuit is connected thereto.

4. In a telephone system, jack-ended trunk lines comprising a first group of trunk lines capable of being connected to apparatus operated by direct-current key impulses and a second group of trunk lines capable of being connected to apparatus operated by alternating-current key impulses, a cord circuit for connecting to any one of said jack-ended trunk lines, a key-set circuit including a set of keys for encoding information into electrical impulses to be transmitted through said cord circuit to a trunk line, means including selectively responsive relay means in said key-set circuit for distinguishing between said first group of trunk lines and said second group of trunk lines, means comprising direct-current voltage sources connected to said set of keys and controlled by the said selectively responsive relay means for enabling the transmission of direct-current key impulses through the said cord circuit to a trunk line if said trunk line is connected to apparatus operated by direct-current key impulses, and means comprising alternating-current voltage sources connected to said set of keys and controlled by the said selectively responsive relay means for enabling the transmission of alternating-current impulses through the said cord circuit to a trunk line if said trunk line is connected to apparatus operated by alternating-current key impulses.

5. In a telephone system, an operator's position, a cord circuit, a first group of trunk circuits each including means for supplying and applying to said operator's position through said cord circuit a first set of electrical conditions indicating that direct-current impulses are to be transmitted over each of said trunk circuits in said first group, a second group of trunk circuits each including means for supplying and applying to said operator's position through said cord circuit a second set of electrical conditions indicating that alternating-current impulses are to be transmitted over each of said trunk circuits in said second group, and a key-set circuit comprising a key-set for encoding information into electrical impulses, a direct-current source, a multifrequency alternating-current source and relay means for alternatively connecting the one or the other of said sources to said key-set; said relay means being selectively responsive to the different sets of electrical conditions applied by each trunk circuit of the said first and the said second groups of trunk circuits to enable said key-set circuit for the transmission of the type of key impulses required by a trunk circuit connected to said operator's position by said cord circuit.

6. In a telephone system, a plurality of cord circuits, a key-set circuit including a set of keys for encoding information into electrical impulses, a first number of trunk circuits each including means for supplying and applying through a cord circuit a continuous potential condition to said key-set circuit and said continuous potential condition indicating that multifrequency alternating-current key impulses are to be transmitted by said key-set circuit, a second number of trunk circuits each including means for supplying and applying through a cord circuit a momentary potential condition to said key-set circuit and said momentary potential condition indicating that direct-current key impulses are to be transmitted by said key-set circuit, a direct-current key impulse source in said key-set circuit, a multifrequency alternating-current key impulse source in said key-set circuit, means in said key-set circuit comprising testing relays selectively responsive to said continuous and momentary potential conditions for determining whether any one of said jack-ended trunk circuits to which a cord circuit is connected is one of said first number or one of said second number of jack-ended trunk circuits, means in said key-seat circuit controlled by said determining means for connecting through a cord circuit said multifrequency alternating-current impulse source to said keys to enable the transmission of multifrequency alternating-current key impulses to any one of said first number of jack-ended trunk circuits, and means in said key-set circuit controlled by said determining means for connecting through a cord circuit said direct-current impulse source to said keys to enable the transmission of direct-current key impulses to any one of said second number of jack-ended trunk circuits.

7. In a multioffice telephone system, and operator position in one office, trunks from said one office to other offices, a key-set circuit at said position comprising a set of digit keys and direct-current and alternating-current sources for transmitting either direct-current or alternat-current coded digit impulses over any one of said trunks, means comprising a cord for connecting said key-set circuit to any one of said trunks, a first group of said trunks extending to an office arranged to receive direct-current coded digit impulses, a second group of said trunks extending to an office arranged to receive alternating-current coded digit impulses, means in each of said first trunks for connecting a first electrical potential through said cord to said key-set circuit to indicate that direct-current coded digit impulses are to be transmitted over any connected one of said first trunks, means in each of said second trunks for connecting a second electrical potential to said key-set circuit to indicate that alternating-current coded digit impulses are to be transmitted over any connected one of said second trunks, and means comprising testing means in said key-set circuit selectively operated upon connection of either of said first and second electrical potentials thereto to connect said direct-current source to said digit keys when said key-set circuit is connected to one of said first trunks thereby to effect the transmission of direct-current coded digit impulses over the connected one of said first trunks responsive to the actuation of any digit key and to connect said alternating-current source to said digit keys when said key-set circuit is connected to any one of said second trunks thereby to effect the transmission of alternating-current coded digit impulses over the connected one of said second trunks responsive to the actuation of any digit key, the digit code thus transmitted over the connected one of said trunks depending upon the digit key which is actuated.

BURTON McKIM.

REFERENCES CITED

The following references are of record in the file of this patent:

UNITED STATES PATENTS

| Number | Name | Date |
|---|---|---|
| 1,914,358 | Brooks | June 20, 1933 |
| 2,153,129 | Bascom | Apr. 14, 1939 |
| 2,188,467 | Wochinger | Jan. 30, 1940 |
| 2,288,251 | Murphy | June 30, 1942 |